UNITED STATES PATENT OFFICE.

WILHELM CONNSTEIN, OF CHARLOTTENBURG, GERMANY, ASSIGNOR TO THE FIRM OF BENNO JAFFÉ, OF MERLINIKENFELDS, GERMANY.

PIPERAZIN QUINATE AND PROCESS OF MAKING SAME.

SPECIFICATION forming part of Letters Patent No. 665,879, dated January 15, 1901.

Application filed June 26, 1899. Serial No. 721,959. (Specimens.)

*To all whom it may concern:*

Be it known that I, WILHELM CONNSTEIN, a subject of the German Emperor, residing at 76 Knesebeckstrasse, Charlottenburg, in the Kingdom of Prussia, German Empire, have invented certain new and useful Improvements in the Manufacture of Piperazin Quinate and Quinates of Piperazin Derivatives and their Alkali Salts; and I do hereby declare the following to be a full, clear, and exact description of the invention, such as will enable others skilled in the art to which it appertains to make and use the same.

This invention relates to a new manufacture of piperazin quinates, under which I comprehend both the quinate of piperazin proper and the quinates of derivatives of piperazin, such as dimethylpiperazin. This production of the quinates of piperazins is carried out by employing molecular proportions of the base and the acid. The reaction in the case, for example, of the normal salt of piperazins is represented by the following equation:

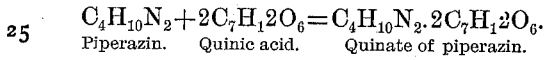
Piperazin.    Quinic acid.    Quinate of piperazin.

The preparation of the quinates in question may be effected by causing quinic acid on a piperazin (including, as stated, not only piperazin proper, but its homologues and derivatives also) in molecular proportions to interact.

The quinic acid and the piperazin or one of its derivatives are preferably mixed in the state of powder and the mixture is heated in an appropriate vessel until it melts, in which condition it is preferably maintained for some time. The mixture is then allowed to cool and heated with a solvent. The separation of the quinate from the solvent is effected by one of the methods to be next described for performing this separation when the salt is prepared by the reaction of quinic acid on piperazin proper or one of its homologues or other derivatives in solution; but the solidified mass which contains piperazin quinate may be used also without treating the same with a solvent. To prepare piperazin quinates, both the compounds which are to be made to react may be dissolved in the least possible quantity of an appropriate solvent. The solution is advantageously allowed to stand for some hours, (but this is not absolutely necessary,) and the salt thus formed is separated by a precipitant or the solvent is eliminated in any suitable manner.

The process can be carried out, for example, as follows: Equivalent quantities of piperazin and quinic acid are dissolved in a minimum quantity of water. The solution is evaporated as much as possible on a water-bath. The remainder of the water is removed by repeated evaporation with a small quantity of alcohol, the residual salt being then dried *in vacuo*. According to another method the solution of the piperazin quinate, as concentrated as possible, is mixed with a precipitating agent, such as absolute alcohol, until no further precipitation takes place. This fact may readily be noted by adding the alcohol in successive small quantities. The quinate thus precipitated is filtered or separated in some other way from the liquid and dried.

It is advisable when mixing the two compounds to use the base in proportion somewhat greater than the molecular qantity and then to wash the excess of base from the finished product with absolute alcohol.

The compounds produced by the methods above set forth have acid properties and form salts with alkalies, of which the sodium, potassium, and lithium salts are specially to be noted. These salts are prepared by adding to the aqueous solution of a piperazin quinate, including either the piperazin quinate proper or the quinate of a piperazin derivative, the molecular proportion of sodium carbonate, potassium carbonate, or lithium carbonate and evaporating the solvent.

Piperazin quinates, including the quinate of piperazin proper and the quinates of piperazin derivatives, are white crystalline powders of feebly-acid taste, easily soluble in water, but not in alcohol, being, in fact, precipitated from their aqueous solutions by alcohol. These compounds have valuable medicinal properties, inasmuch as they prevent the formation or separation of uric acid in gout, stone, neurasthenia, and the like. Their general formula is:

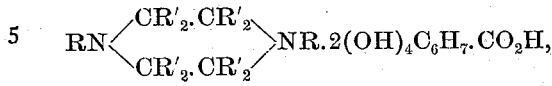

in which formula R and R' mean a monovalent radical, the formula of the quinate of piperazin proper being:

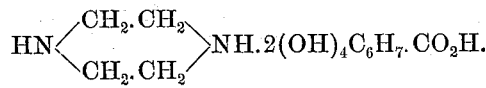

From the above it will be understood that the terms "a piperazin" and "piperazin quinate" as used in the claims embrace both the piperazin proper and the quinate of piperazin proper and the homologues or derivatives of piperazin and quinates of the homologues or derivatives of piperazin, respectively, which are equivalent bodies. These bodies may all be classed under the additional generic designation "diethylene-diamins" and "diethylene-diamin quinates."

Having now particularly described and ascertained the nature of this invention and in what manner the same is to be performed, I declare that what I claim is—

1. The process of preparing piperazin quinates, which consists in allowing molecular proportions of a piperazin and quinic acid to react upon one another.

2. The process of preparing piperazin quinates, which consists in mixing molecular proportions of a piperazin and quinic acid in a solvent and separating the salt thus produced.

3. The process of preparing a piperazin quinate which consists in mixing substantially molecular quantities of a piperazin in a solvent, precipitating the resultant quinate by a precipitating agent and separating it from the liquid.

4. The process of preparing alkali salts of piperazin quinates which consists in adding substantially molecular proportions of an alkali carbonate to a solution of a piperazin quinate and then eliminating the solvent.

5. The process which consists in mixing substantially molecular proportions of a piperazin and quinic acid in a solvent and separating the resultant quinate, then dissolving the latter and adding in substantially molecular quantity of an alkali carbonate to the solution, and finally eliminating the solvent.

6. As a new chemical compound a piperazin quinate having the general formula above given which forms white crystalline powders having feebly-acid properties and which are soluble in water but not in alcohol.

7. As a new chemical compound, piperazin quinate proper having the formula above given, which forms a white crystalline powder of feebly-acid properties and which is soluble in water but insoluble in alcohol.

In testimony whereof I have affixed my signature in presence of two witnesses.

WILHELM CONNSTEIN.

Witnesses:
WOLDEMAR HAUPT,
HENRY HASPER.